United States Patent

Pelto-Huikko

[11] Patent Number: 5,579,868
[45] Date of Patent: Dec. 3, 1996

[54] PROCEDURE FOR OPERATING AN ELEVATOR, AND AN ELEVATOR MACHINERY

[75] Inventor: Raimo Pelto-Huikko, Vantaa, Finland

[73] Assignee: Kone OY, Helsinki, Finland

[21] Appl. No.: 374,712

[22] PCT Filed: May 31, 1994

[86] PCT No.: PCT/FI94/00225

§ 371 Date: Feb. 24, 1995

§ 102(e) Date: Feb. 24, 1995

[87] PCT Pub. No.: WO94/27905

PCT Pub. Date: Dec. 8, 1994

[30] Foreign Application Priority Data

Jun. 1, 1993 [FI] Finland ................... 932504

[51] Int. Cl.⁶ .................................. B66B 9/04
[52] U.S. Cl. .............................. 187/275; 60/414
[58] Field of Search .................. 187/275, 274; 60/414, 413, 372, 429, 464

[56] References Cited

U.S. PATENT DOCUMENTS

| | | | |
|---|---|---|---|
| 2,269,786 | 1/1942 | Rose | 187/275 |
| 4,693,080 | 9/1987 | Van Hooff | 60/414 |
| 4,761,953 | 8/1988 | Rosman | 60/414 |

FOREIGN PATENT DOCUMENTS

| | | | |
|---|---|---|---|
| 2525150 | 12/1976 | Germany . | |
| 3040717 | 5/1982 | Germany . | |
| 3136739 | 3/1983 | Germany . | |
| 3310702 | 9/1984 | Germany . | |
| 3736769 | 5/1989 | Germany . | |
| 4333484 | 11/1992 | Japan | 187/275 |
| WO9405583 | 3/1994 | WIPO . | |

Primary Examiner—Kenneth Noland
Attorney, Agent, or Firm—Birch, Stewart, Kolasch & Birch, LLP.

[57] ABSTRACT

Procedure for operating an elevator, in which the power for moving the car as well as the accelerating/decelerating power of the whole system is, in all motional states of the elevator, obtained from/returned to a hydraulic pressure accumulator (1) charged by an auxiliary gear (3). The elevator machine comprises a hydraulic pressure accumulator (1), hydraulic actuators (2) for adapting the power taken from/fed into the pressure accumulator to the motional state of the elevator car, and an auxiliary gear (3) for pumping hydraulic energy into the pressure accumulator.

16 Claims, 1 Drawing Sheet

PROCEDURE FOR OPERATING AN ELEVATOR, AND AN ELEVATOR MACHINERY

The present invention relates to a procedure for operating an elevator and to an elevator machinery.

BACKGROUND OF THE INVENTION

At present, the power taken by elevators from the electric supply netork varies greatly. The power required is at a maximum during ascent of a fully loaded elevator car, and this maximum power determines the design of the electrical equipment and interface. During descent of the elevator car, the car can be braked electrically by feeding electric energy back into the network. Often, however, all of the kinetic and potential energy of the elevator car is converted into waste heat in suitable braking devices.

SUMMARY OF THE INVENTION

The object of the present invention is to eliminate the above-mentioned drawbacks. A specific object of the invention is to produce a new type of elevator machinery and a procedure for operating it, enabling the energy consumption of the elevator and, above all, its connected load on the electric network to be reduced.

As for the features characteristic of the invention, reference is made to the claims.

In the procedure of the invention for operating an elevator machinery in the various motional states of the elevator car, the power required for moving the car as well as the power for accelerating or decelerating the system is taken from or returned to a hydraulic pressure accumulator. Moreover, the pressure accumulator is charged by means of an auxiliary gear to compensate the losses involved. In other words, the energy needed for moving the elevator car is taken from the pressure accumulator, and the energy regained from the movement of the car is returned to the pressure accumulator. In this context, 'motional states' of the elevator car means the movement of the elevator car during acceleration, braking and travel at constant speed in the up or down direction. The term 'system' refers to the elevator car and the parts moving with it.

The auxiliary gear is preferably operated at an essentially constant power and for relatively long times, especially when heavy loading of the elevator is to be expected. The connected load of the auxiliary gear on the electric network is substantially smaller than the maximum power required for moving the elevator car.

The elevator machinery of the invention for lifting and lowering an elevator car comprises a hydraulic pressure accumulator which is connected to hydraulic actuators for adapting the power taken from/fed into the pressure accumulator to the motional state of the elevator car and an auxiliary gear for pumping hydraulic energy into the pressure accumulator. Thus, according to the invention, the hydraulic actuators convert the hydraulic pressure of the pressure accumulator into kinetic and potential energy of the elevator car and, vice versa, the kinetic and potential energy of the elevator car into hydraulic pressure of the pressure accumulator, depending on the motional state of the elevator car.

Thus, according to the invention, the pressure accumulator acts as a primary energy source of the elevator car, by means of which the car is lifted and to which the kinetic and potential energy of the elevator car is returned when the motional state of the car permits. Since the lifting and lowering of the elevator car always involves energy losses resulting from the conversion of energy into heat, and because the operation of the elevator machinery may be irregular, e.g. when there are successive ascents with full car and descents with empty car, the elevator machinery is equipped with an auxiliary gear used to pump the required energy into the pressure accumulator.

The maximum power required by the auxiliary gear is, however, considerably lower than the momentary maximum power required by a corresponding elevator machinery, because the auxiliary gear can be operated at its regular maximum power essentially continuously, regardless of the load of the elevator at any particular instant.

The elevator machinery of the invention can be used e.g. in hydraulic elevators, drum drive elevators and traction sheave elevators.

In hydraulic elevators, the hydraulic actuators of the elevator machinery of the invention preferably comprise a hydraulic converter between the pressure accumulator and the hydraulic cylinder. The variator, which is provided e.g. with a regulating pump and a hydraulic motor, is used to vary the speed of the elevator car during both ascent and descent.

In a drum drive elevator, the elevator machinery of the invention preferably comprises an adjustable hydraulic motor.

In a traction sheave elevator, the elevator machinery of the invention preferably also comprises an adjustable hydraulic motor which is used to rotate the traction sheave of the elevator or which receives the rotary motion of the traction sheave and converts it into hydraulic pressure of the pressure accumulator.

The elevator machinery of the invention has significant advantages as compared with previously known technology. It produces a significant reduction in energy consumption as the released potential and kinetic energy of the elevator car is stored with high efficiency in the pressure accumulator, thus making it unnecessary to use an expensive and uneconomic system of returning energy into the electric network, which causes disturbances in the network. Likewise, the invention significantly reduces the installed connected load because the amount of energy taken from the network is so small that no return of power is needed. Moreover, energy is taken from the network at a constant rate independently of the momentary load of the elevator car. Besides, no separate equipment is needed for reserve and emergency operation of the elevator car, but e.g. during a power failure the elevator car is driven to a floor using the energy of the pressure accumulator.

BRIEF DESCRIPTION OF THE DRAWINGS

In the following, the invention is described in detail by referring to the attached drawings, in which.

BRIEF DESCRIPTION OF THE INVENTION

Figure 1:
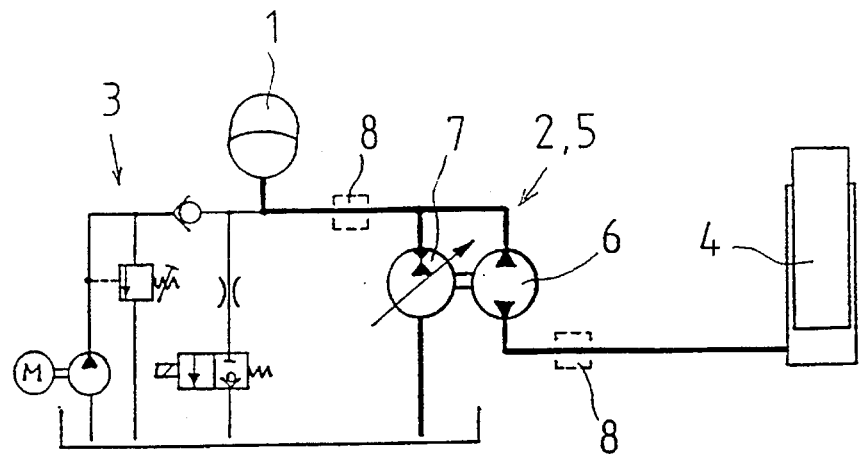
FIG. 1 presents a diagram of the elevator machinery of the invention as used in a hydraulic elevator.

FIG. 1 shows a diagram representing an elevator machinery according to the invention as used in a hydraulic elevator. In the elevator machinery, a hydraulic pressure accumulator 1 is connected to the hydraulic cylinder 4 of the hydraulic elevator via a hydraulic converter 5. The hydraulic converter 5 consists of a hydraulic motor 7 and a regulating pump 6. The pressure accumulator 1 also connected to an auxiliary gear 3 used for charging the pressure accumulator. In addition, the system is provided with a check valve 8 to disconnect the hydraulic converter 5 from the pressure accumulator 1 and hydraulic cylinder 4 during standstill of the elevator.

The elevator machinery in FIG. 1 functions as follows. Each load condition of the elevator corresponds to a given cylinder pressure, and the pressure of the pressure accumulator changes as little as possible during operation. For each value of the cylinder pressure there is a certain value of the displacement of the adjustable motor at which the hydraulic system is in balance, i.e. remains at rest by virtue of the pressure of the pressure accumulator. When the displacement of the adjustable motor is increased, the torque acting on the shaft of the pump increases and the pump starts to drive oil into the cylinder 4. If the displacement is decreased, the contrary takes place and the elevator car starts moving down.

The power taken from or fed into the pressure accumulator always corresponds to the motional state of the elevator. During braking, the kinetic energy of the elevator is recovered as potential energy during ascent and as pressure accumulator energy during descent.

Due to natural losses, such as friction and leakages, and during upward peak traffic, the pressure accumulator is discharged after a few full carloads transported in the upward direction, so the system is provided with an auxiliary gear 3 which pumps the hydraulic fluid back into the pressure accumulator 1. The auxiliary gear is not required to have the properties of an elevator drive because its operation is not dependent on the momentary motional state of the elevator car but rather, in the first place, on the energy required for the next passage of the car.

During upward peak traffic, the auxiliary gear 3 is operated e.g. at 100% connection time, so the connected load is very low as compared with traditional hydraulic elevators. At other times the auxiliary gear can be turned on when necessary, i.e. as required by the state of charge of the pressure accumulator and the expected traffic volume.

Figure 2:
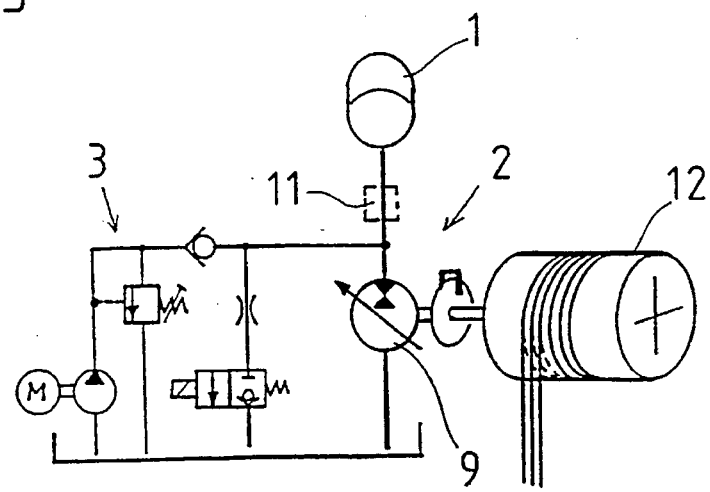
FIG. 2 presents a diagram of the elevator machinery of the invention as used in a drum drive elevator.

FIG. 2 presents an elevator machinery according to the invention as used in a drum drive elevator. This system has a variable hydraulic motor 9 coupled with the drum 12 of the drum drive elevator and having a connection to the pressure accumulator 1. In addition, there is a regulating valve 11 between the pressure accumulator and the hydraulic motor. The pressure accumulator 1 is also connected to the auxiliary gear 3.

The displacement of the hydraulic motor can be varied steplessly in the range 30–100%. Thus, at all loads of the elevator, the motor can provide a displacement which keeps the system in balance. During descent of the car, the hydraulic motor acts as a pump and the potential energy released, and in connection with stopping the kinetic energy as well, is thus stored in the pressure accumulator 1 at a high rate of efficiency, the total efficiency being about 0.8. During ascent, the hydraulic motor acts as a motor discharging the pressure accumulator 1 as it rotates the drum 12 which hoists the elevator car. The drum drive elevator machinery in FIG. 2 can be implemented in a very compact form if the drum 12 is also used as a pressure accumulator.

Figure 3:
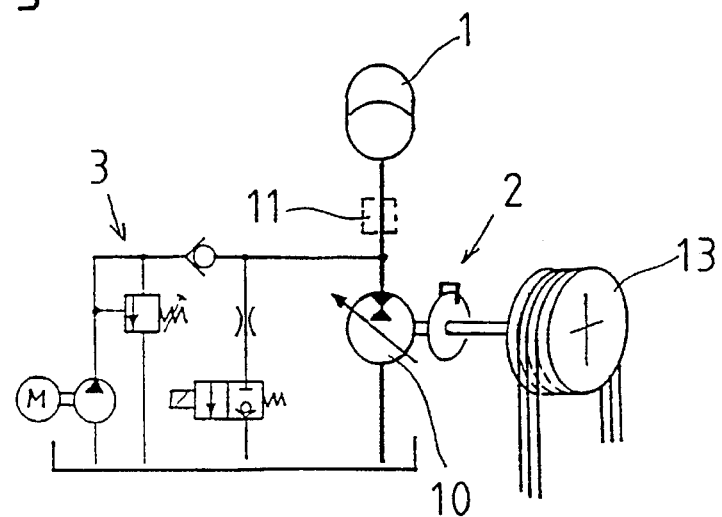
FIG. 3 presents a diagram of the elevator machinery of the invention as used in a traction sheave elevator.

The hydraulics of the drum drive elevator described above can also be used as the machinery of a traction sheave elevator as shown in FIG. 3. The machinery in FIG. 3 is like that in FIG. 2 except that the drum 12 is replaced with a traction sheave 13 and an elevator car and counterweight linked with it. The counterweight allows the level of the torque and power to be substantially reduced, but the hydraulic motor 10 is required to have a larger adjustment range of −100% . . . +100% because in a traction sheave elevator the torque changes its direction. In other respects the apparatus works as in the drum drive elevator.

Regardless of the above-described structural solutions of different elevator types, all three elevator types, hydraulic elevator, drum drive elevator and traction sheave elevator, function essentially in the same way in the elevator machinery of the invention. In all three cases, the ascent of the elevator is effected by means of a hydraulic system and the kinetic and potential energy released during descent and braking is recovered and returned into a hydraulic pressure accumulator, without having to convert the energy from one form into another. In this way, losses can be kept at a minimal level while maintaining a high total efficiency.

The invention has been described above by the aid of a drawing, but different embodiments of the invention are possible within the inventive idea defined by the claims.

I claim:

1. A procedure for operating an elevator system, comprising the steps of:
    in the motional states of the elevator, obtaining from/returning to a hydraulic pressure accumulator (1) power for moving the elevator car as well as for the accelerating/decelerating of the system, and
    charging the pressure accumulator by means of an auxiliary gear (3).

2. The procedure according to claim 1, wherein the charging step includes operating the auxiliary gear at an essentially constant power which is substantially smaller than a maximum power required for moving the elevator car.

3. An elevator machinery system for lifting and lowering an elevator car, comprising
    a hydraulic pressure accumulator (1),
    hydraulic actuators (2) for adapting the power taken from/fed into the pressure accumulator to the motional state of the elevator car, and
    an auxiliary gear (3) for pumping hydraulic energy into the pressure accumulator.

4. The elevator machinery system according to claim 3 for use in a hydraulic elevator, further comprising an hydraulic cylinder (4), wherein the hydraulic actuators (2) include a hydraulic converter (5) placed between the pressure accumulator (1) and the hydraulic cylinder (4).

5. The elevator machinery system according to claim 4, wherein the hydraulic converter (5) includes a regulating pump (6) and a hydraulic motor (7).

6. The elevator machinery system according to claim 4, further comprising check valves (8), wherein, during standstill, the hydraulic converter (5) is disconnected from the pressure accumulator (1) and hydraulic cylinder (4) by means of the check valves (8).

7. The elevator machinery system according to claim 3 for use in a drum drive elevator, wherein the hydraulic actuators (2) include an adjustable hydraulic motor (9).

8. The elevator machinery system according to claim 7, wherein the pressure accumulator (1) is disposed in a drum of a drum drive elevator.

9. The elevator machinery system according to claim 3 for use in a traction sheave elevator, wherein the hydraulic actuators (2) include an adjustable hydraulic motor (10).

10. The elevator machinery system according to claim 7, further comprising a check valve (11), during standstill, the pressure accumulator (1) is disconnectable from the adjustable hydraulic motor (9, 10) by means of the check valve (11).

11. The elevator machinery system according to claim 5, further comprising check valves (8), wherein, during standstill, the hydraulic converter (5) is disconnectable from the pressure accumulator (1) and hydraulic cylinder (4) by means of the check valves (8).

12. The elevator machinery system according to claim 8, further comprising a check valve (11), wherein, during standstill, the pressure accumulator (1) is disconnectable from the adjustable hydraulic motor (9,10) by means of the check valve (11).

13. The elevator machinery system according to claim 9, further comprising a check valve (11), wherein, during standstill, the pressure accumulator (1) is disconnectable from the adjustable hydraulic motor (9,10) by means of the check valve (11).

14. A procedure for operating an elevator system, comprising the steps of:

in the motional states of the elevator, obtaining power from/returning power to a hydraulic pressure accumulator (1) for moving the elevator car as well as for the accelerating/decelerating of the system, and charging the pressure accumulator by means of electrically operating an auxiliary gear (3), the electrical operation of the auxiliary gear occurring conducted simultaneously with the charging.

15. The procedure according to claim 14, wherein the electrically operating step includes operating the auxiliary gear at an essentially constant power which is substantially smaller than a maximum power required for moving the elevator car.

16. The elevator machinery system according to claim 3, wherein the auxiliary gear (3) is electrically operable during pumping of the hydraulic energy.

* * * * *